United States Patent [19]

Herion

[11] Patent Number: 5,214,639
[45] Date of Patent: May 25, 1993

[54] COMMUNICATION SWITCHING ELEMENT AND METHOD FOR TRANSMITTING VARIABLE LENGTH CELLS

[75] Inventor: Michel A. R. Herion, Brussels, Belgium

[73] Assignee: Alcatel N.V., Amsterdam, Netherlands

[21] Appl. No.: 565,310

[22] Filed: Aug. 9, 1990

[30] Foreign Application Priority Data

Aug. 9, 1989 [WO] PCT Int'l Appl. .................. PCT/EP89/00942

[51] Int. Cl.⁵ .......................... H04L 12/56; H04J 3/16
[52] U.S. Cl. ...................................... 370/60; 370/94.1
[58] Field of Search ..................... 370/94.1, 94.2, 94.3, 370/60, 60.1, 58.1, 58.2, 58.3

[56] References Cited

U.S. PATENT DOCUMENTS

| 4,920,534 | 4/1990 | Adelmann et al. | 370/94.1 |
| 4,947,388 | 8/1990 | Kuwahara et al. | 370/94.1 |
| 5,050,166 | 9/1991 | Cantoni et al. | 370/94.1 |

FOREIGN PATENT DOCUMENTS

| 0299473 | 1/1989 | European Pat. Off. |
| 0300876 | 1/1989 | European Pat. Off. |
| 0301934 | 2/1989 | European Pat. Off. |

OTHER PUBLICATIONS

Y. Tamir, et al., "High-Performance Multi-Queue Buffers for VLSI Communication...", UCLA Comp. Sci. Dept., IEEE, 1988, pp. 343-354.
"A shared buffer memory switch for an ATM exchange", by H. Kuwahara et al. ICC 1989 Conf. Jun. 11-14, 1989 Boston, pp. 118-122.
"The Bell System—Technical Journal" vol. XLIII, No. 5, part I, Sep. 1964, pp. 1869-1870.

Primary Examiner—Douglas W. Olms
Assistant Examiner—Wellington Chin
Attorney, Agent, or Firm—Brunell & May

[57] ABSTRACT

The switching element is used for transferring, between X inputs (I1-IX) and Y outputs (O1-OY), cells divided into subcells of which only the first contains information about the destination output(s) of the cell. This switching element includes: a buffer memory (BM) with a plurality (C) of memory locations each having an address (K); and a memory management means (BMMU) for providing (FMLMC) addresses of free memory locations for storing the subcells therein, and for storing (BQ1-BQY, SLM), under the form of linked lists, the memory location addresses used by the subcells, each list being associated to a distinct cell. The method is adapted to process variable length cells divided into subcells each containing a header (SCH) to distinguish a first/last subcell (FSC/LSC) of a cell from other subcells (ISC, LSC). Use is made of a subcell logic (SL) to detect the succession in either order of a subcell pertaining to a cell and of either a first/last subcell (FSC/LSC) of another cell or an idle subcell so as to identify the last/first subcell (LSC/FSC) of a cell.

46 Claims, 4 Drawing Sheets

COMMUNICATION SWITCHING ELEMENT AND METHOD FOR TRANSMITTING VARIABLE LENGTH CELLS

TECHNICAL FIELD

The present invention relates to a communication switching element having X inputs and Y outputs and wherein X and Y are not both equal to one, for transferring cells from each of said inputs to at least one of said outputs, said cells being subdivided into subcells and said switching element including:
a buffer memory with a plurality of memory locations each having an identity;
means for writing into said memory locations distinct subcells incoming on said inputs;
a storage means storing memory location identities of subcells; and
means for reading said subcells out of said buffer memory under the control of said storage means and for supplying these read subcells to said outputs.

BACKGROUND ART

Such a communication switching element adapted to switch cells or packets subdivided in subcells or subpackets is already known in the art, e.g. from the published European patent application EP 0 301 934-A1. Therein, only the first subcell of each cell contains information about the output destination of the whole cell and the storage means include First-In-First-Out (FIFO) queue memories—one for each output—which only store the memory location identities or addresses of the first subcells of each cell. Each of these stored identities is further associated to a number corresponding to the length of the cell to which the first subcell belongs, i.e. the number of subcells constituting the cell. This number, which has to be known when the identity corresponding to the first subcell is stored in the storage means, is also contained in this first subcell and is used to rebuild the cell at the output of the switching element. This means that there is a practical limitation on the number of subcells constituting a cell. Indeed, when for instance 4 bits are reserved in the first subcell to indicate the length of the cell in binary code, this cell is limited to have a maximum of 16 subcells.

DISCLOSURE OF INVENTION

An object of the present invention is to provide a communication switching element of the above known type but for which there is no requirement to provide information indicative of the length of a cell with the first subcell thereof and for which there is no limitation on the number of subcells constituting this cell.

According to the invention this object is achieved due to the fact that said stored memory location identities are linked in identity groups, each of said identity groups corresponding to one of said cells.

In this way, the linked identities groups give the necessary information for rebuilding the cell at the destination output independently of the length of this cell and without knowing a priori the number of subcells constituting it.

It is to be noted that the article "A shared buffer memory switch for an ATM exchange" by H. Kuwahara et al, published in the proceedings of the ICC '89 conference of Jun. 11-14, 1989 in Boston, pages 118 to 122, also discloses a communication switching element using linked lists of memory location identities or addresses. In this known switching element each linked list is associated with all the memory location addresses of cells having a same output as destination. However this known switching element is not adapted to handle subcells of cells wherein, for instance, only one of the subcells, e.g. the first subcell, contains information about the output destination of the whole cell.

Also in the communication switching element disclosed in the above European patent application, each input is associated with a number of dedicated memory locations of the buffer memory, e.g. the first input is associated to the memory locations having the identities 1, 9, 17, 25, . . . This means that the buffer memory has to be dimensioned for the worst case traffic load, individually for each input, to achieve a required cell loss probability performance. Moreover, the size of the buffer memory increases both with the number of inputs of the switching element and with the length of the cells to be switched.

Another object of the present invention is to provide a communication switching element of the above known type but wherein the size of the buffer memory may be reduced while meeting the above required cell loss probability performance.

According to the invention, this other object is achieved due to the fact that said buffer memory is fully shared between said X inputs and said Y outputs.

In this way the size of the buffer memory may be reduced because the locations thereof are no more associated to the inputs. This is particularly useful when switching very long cells.

In the communication switching element disclosed in the above European patent application, all the inputs are successively and cyclically selected by the writing means. The incoming subcells are thus written by the writing means in successive memory locations of the buffer memory in the order of the inputs. This means that, even when no subcell is applied to an input, the corresponding memory location thereof is reserved. As a consequence, the buffer memory is not efficiently used.

Still another object of the present invention is to provide a communication switching element of the above known type but wherein the buffer memory is used in an optimal way.

Still another characteristic feature of the invention is that said communication switching element includes a second storage means for storing the identities of the free memory locations available for writing said subcells therein and for providing these identities to said writing means upon a subcell having to be written in said buffer memory.

In this way, the incoming subcells are written in free or already read-out memory locations whose identities are provided by the second storage means. All the free memory locations may thus be used because no one is reserved for a particular input. As a result, the storage efficiency of the buffer memory is increased.

It is to be noted that the published European patent application EP 0 300 876-A1 also discloses a communication switching element including a second storage means for providing addresses of free memory locations of the buffer memory in order to write cells therein. However, also this known switching element is not adapted to handle subcells of cells divided into such subcells written in distinct—dedicated or not—memory locations.

Also, another characteristic feature of the invention is that said communication switching element is integrated in a single electronic chip.

This is possible owing to the optimal size and the efficient use of the buffer memory.

A further characteristic feature of the invention is that each of said cells is subdivided into a variable plurality of subcells.

It will be appreciated from the above that the present invention thus relates to a communication switching element including buffer memory management means and characterized in that the buffer memory is fully shared between the X inputs and the Y outputs and in that, under the control of this buffer memory management means, the writing means write the subcells in any free ones of the memory locations of this buffer memory and the reading means rebuild each cell in function of the identities of the memory locations into which the subcells pertaining to that cell are written. A characteristic of this buffer memory management means is that it includes the storage means.

The present invention also relates to a method for transmitting variable length communication messages using cells divided into subcells, each of said subcells containing a subcell header in order to distinguish a first/last subcell of a cell from other subcells.

According to the invention, the present method is characterized by a subcell logic able to detect a succession in any order of a subcell pertaining to a cell and of a subcell not pertaining to any cell so as to recognize said subcell pertaining to a cell as the last/first subcell of said cell.

Still according to the invention, the present method is characterized by a subcell logic able to detect a succession in any order of a subcell pertaining to a first cell and of a first/last subcell pertaining to a second cell without any other intervening subcells to identify said subcell pertaining to said first cell as the last/first subcell of said first cell.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

In these drawing the various connections are represented by single leads although they may include a plurality of such leads. Also, the drawings do not show all the control circuitry as the latter becomes obvious from the description for a person skilled in the art.

Figure 4:
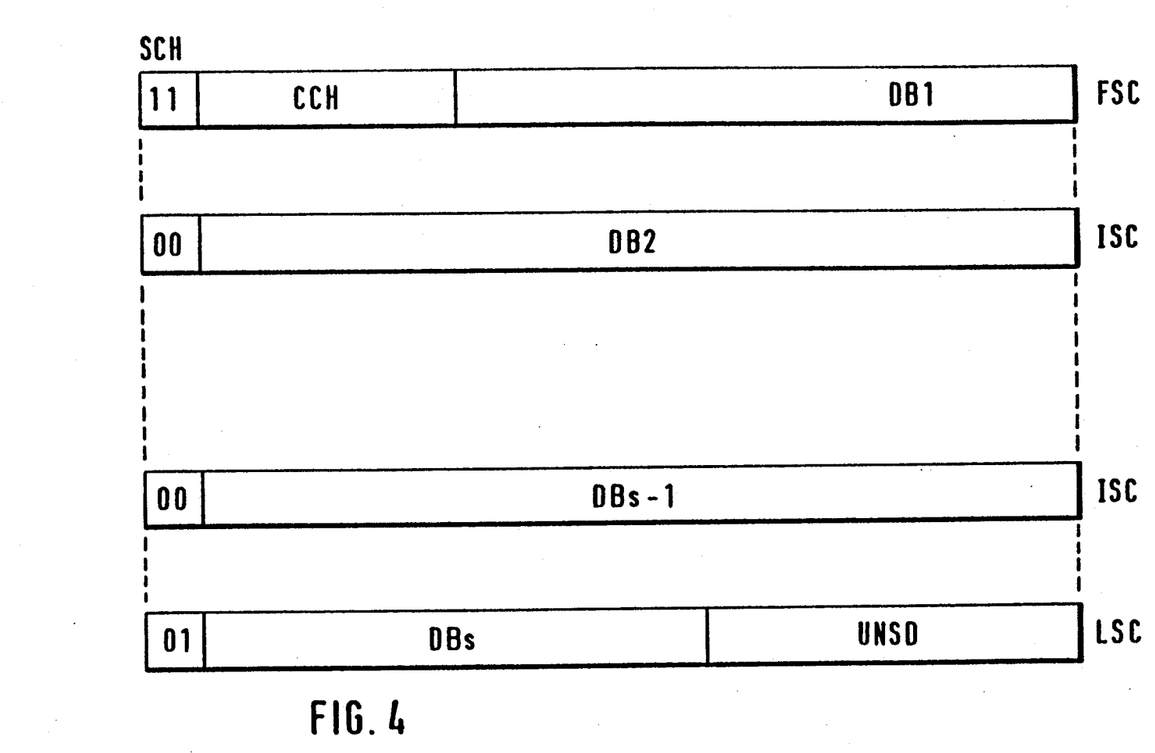
FIG. 4 shows a variable length cell able to be switched by the switching element of FIG. 1.

The present communication switching element with X inputs I1/Ix and Y outputs O1/Oy (with X and Y not simultaneously equal to 1) is adapted to switch digital signals grouped in cells or packets of variable lengths. Such a cell, shown in FIG. 4 is for instance constituted by a series of successive subcells FSC, ISC, ..., ISC, LSC of equal length, e.g. of 162 bits=2 bits+20 bytes. Each of these subcells contains a subcell control header SCH (2 bits) and a data block DB1-DBS, and the first subcell FSC moreover contains a cell control header CCH which for instance includes routing data RT allowing the switching element to determine to which of the output(s) O1/Oy all the subcells pertaining to the same cell have to be transferred. In the present description, the subcell control header SCH is assumed to have an explicit binary value 11, 00 or 01 indicating that the subcell is the first subcell FSC, an intermediate subcell ISC or the last subcell LSC of the cell respectively.

It is to be noted that all the intermediate subcells ISC only contain the subcell control header SCH and a data block DB2/DBS of 20 bytes, whilst the data block DB1 contained in the first subcell FSC is shorter because the cell control header CCH also forms part of these 20 bytes, and that the last subcell may contain unused bits UNSD depending on the rest of the subdivision of the cell of variable length into the subcells. Either the length of the effective data block DB1 to DBs or the number of unused bits UNSD may be indicated in the cell control header CCH directly or under a coded form.

Cells subdivided into subcells containing a subcell header SCH indicating whether the subcell is a first, intermediate or last subcell is already known, e.g. from the published International patent application WO 88/07293 (which corresponds to U.S. Pat. No. 5,050,166. However therein, additionally to the subcell control header SCH and the data block DB1/DBS, all the subcells contain an access control field for controlling the transmission of the slots through the network and a source identifier field which enables the logical association of all the subcells belonging to a same cell and their reassembly into the original cell.

Figure 1:
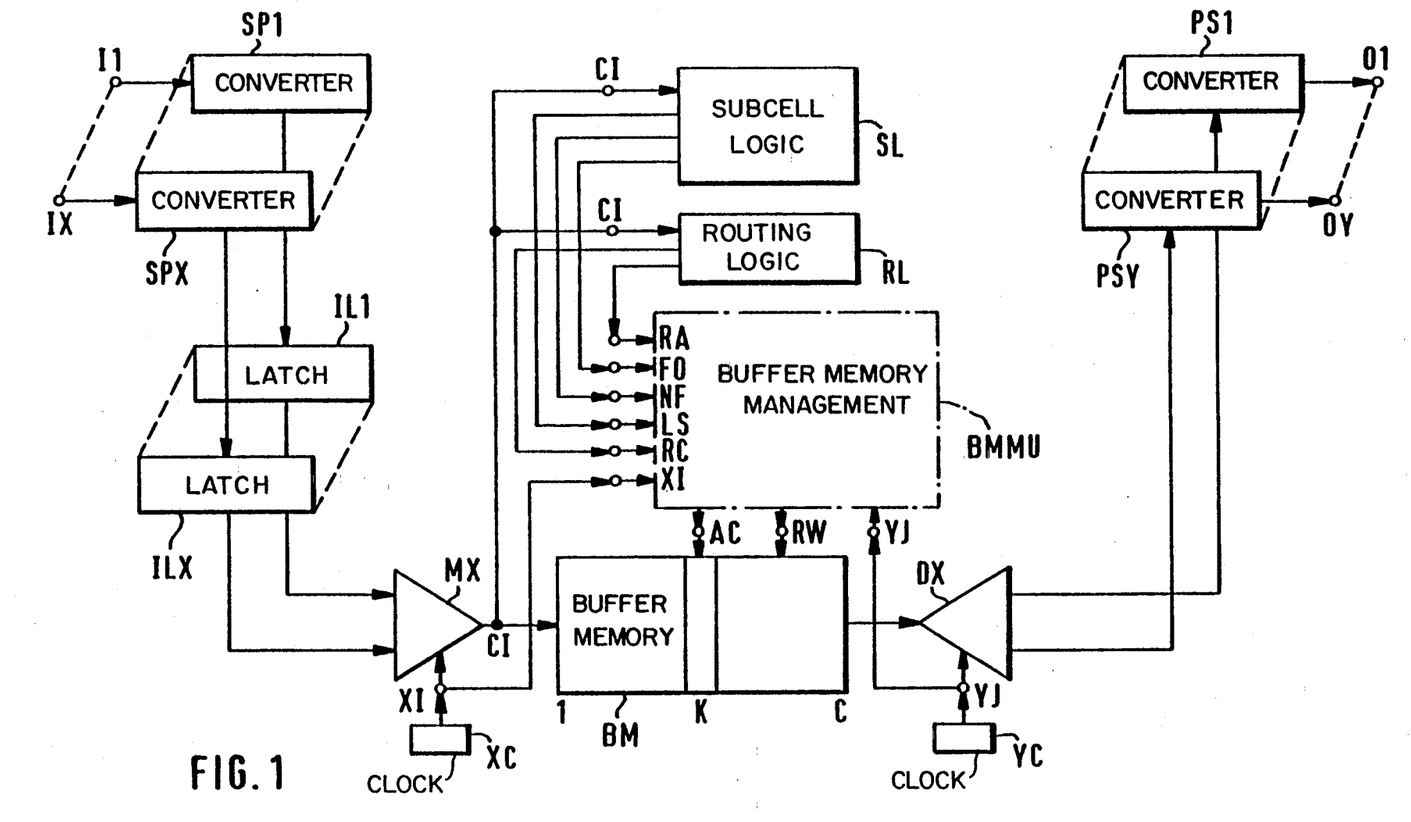
FIG. 1 represents a communication switching element according to the invention.

Referring to FIG. 1, the inputs I1-Ix of the switching element represented therein are connected to respective data inputs of a multiplexer circuit MX through the cascade connection of a respective series-to-parallel converter circuit SP1/SPx and a respective latch circuit IL1/ILx. The data output CI of the multiplexer MX is coupled to the data input CI of a RAM buffer memory BM, the selection input XI of this multiplexer MX being controlled by an input clock circuit XC able to successively connect all the X multiplexer inputs to the multiplexer output CI during a single subcell period. Such a subcell period is the time interval during which one subcell is received in a series-to-parallel converter circuit SP1/SPx.

The buffer memory BM is fully shared and its data output is coupled to the data input of a demultiplexer DX whose Y data outputs are coupled to respective ones of the outputs O1/Oy via respective ones of Y parallel-to-series converter circuits PSI/PSy. The selection input YJ of the demultiplexer DX is controlled by an output clock circuit YC able to successively connect the demultiplexer input to the Y demultiplexer outputs during a single subcell period.

It is to be noted that for subcells having a length of 162 bits and for a same bitrate of 50 Megabits/second at the inputs and at the outputs, one subcell period is equal to:

$$162/50 = 3.24 \text{ microseconds.}$$

More in detail, when for instance the switching element has X=16 inputs and Y=16 outputs, 16 write-in and 16 read-out operations, i.e. 32 operations, have to be performed on the buffer memory BM during one single subcell period of 3.24 microseconds. As a result each of these operations has to be performed in:

3.24/32=101.25 nanoseconds.

On the other hand, when for instance X=16 and Y=32, 48 operations have to be performed during the same subcell period. This means that each of these operations has to be performed in:

3.24/48=67.50 nanoseconds.

The buffer memory BM is subdivided into C, e.g. 512, buffers or memory locations each able to store one subcell, e.g. of 162 bits, and has an address input AC as well as a read/write selection input RW respectively coupled to like named outputs of a buffer memory management unit BMMU.

The switching element further includes a subcell logic SL and a routing logic RL which are both coupled to the data output CI of the multiplexer MX.

The subcell logic SL is mainly a detector to detect and check the subcell control header SCH of each subcell and to provide an activated output signal LS, FO or NF depending on this subcell being a last subcell LSC, a first subcell FSC or not a first subcell respectively.

The routing logic RL performs the analysis of the routing data RT of the cell control header CCH of each first subcell FSC and provides activated output signals RA or RC which are a function of RT. More particularly, the signal RA provides the identity of one or more of the outputs O1/Oy to which the subcell has to be transferred, whilst the signal RC indicates the number of these selected outputs, i.e. 1 for a point-to-point transfer and more than 1 for a point-to-multipoint transfer. The type of routing data RT and the related analysis process performed by the routing logic RL to generate the output signals RA and RC depends on the routing method used. The cell control header CCH may for instance contain Y bits as routing data RT, each of these bits corresponding to an output O1/Oy to which the cell has to be transferred.

The buffer memory management unit BMMU is coupled to the above mentioned outputs LS, FO, NF of SL; RA, RC of RL; XI of XC and YJ of YC and manages the use of the buffers of the memory BM as it provides addresses of free buffers, makes them busy when used and free when no longer used. Under the control of the signals applied to its inputs it also controls via the read-/write selection signal RW the write-in and the read-out operations on the buffer memory BM and builds up linked lists each linking the buffer memory addresses of the subcells of a same cell. This is necessary since the subcells of a same cell are written in uncorrelated locations of the buffer memory BM whilst they have to be routed to the same output(s) O1/Oy and in the same order as they are in this cell when applied to an input I1/Ix.

In brief the operation of the above switching element is as follows. When a subcell of a cell of variable length such as the one shown in FIG. 4 is applied to one of the inputs I1/1X, e.g. I1, of the switching element, it is received in the corresponding series-to-parallel converter circuit SP1. From this converter circuit SP1, the thus obtained parallel version of the subcell is transferred into the corresponding latch circuit IL1 after which it is supplied to the multiplexer MX. Under the control of a clock signal XI provided at the like named input by the input clock circuit XC, the subcell is at a certain moment, corresponding to this input I1, supplied to the data input CI of the buffer memory BM as well as to the subcell logic SL and the routing logic RL. Therein it is determined if the subcell is a first subcell FSC, a last subcell LSC or not a first subcell, and to which output or outputs O1/OY this subcell—and the following subcells pertaining to the same cell—have to be transferred respectively. The resultant output signals FO, LS, NF and RA, RC are supplied to the buffer memory management unit BMMU.

Under the control of the clock signal XI the unit BMMU provides the address of a free buffer, say K, to the address input AC of the buffer memory BM as a consequence of which the subcell at the data input CI of the buffer memory BM is written in the buffer thereof having the address K. This address K is made busy and is added to a linked list of addresses of all the already received subcells of a same cell (hereby the signals FO, NF, LS and RA, RC are used). In this list the addresses are ordered in the same order as the subcells of the cell.

During a read-out operation, under the control of the clock signal YJ provided at the like named input by the output clock circuit YC, the address of a subcell is supplied to the address input AC of the buffer memory BM and the subcell contained in this buffer is read-out and transferred to the data output of the buffer memory BM. From there it is supplied via the demultiplexer DX to the output or one of the outputs initially indicated by the signal RA.

Figure 2:
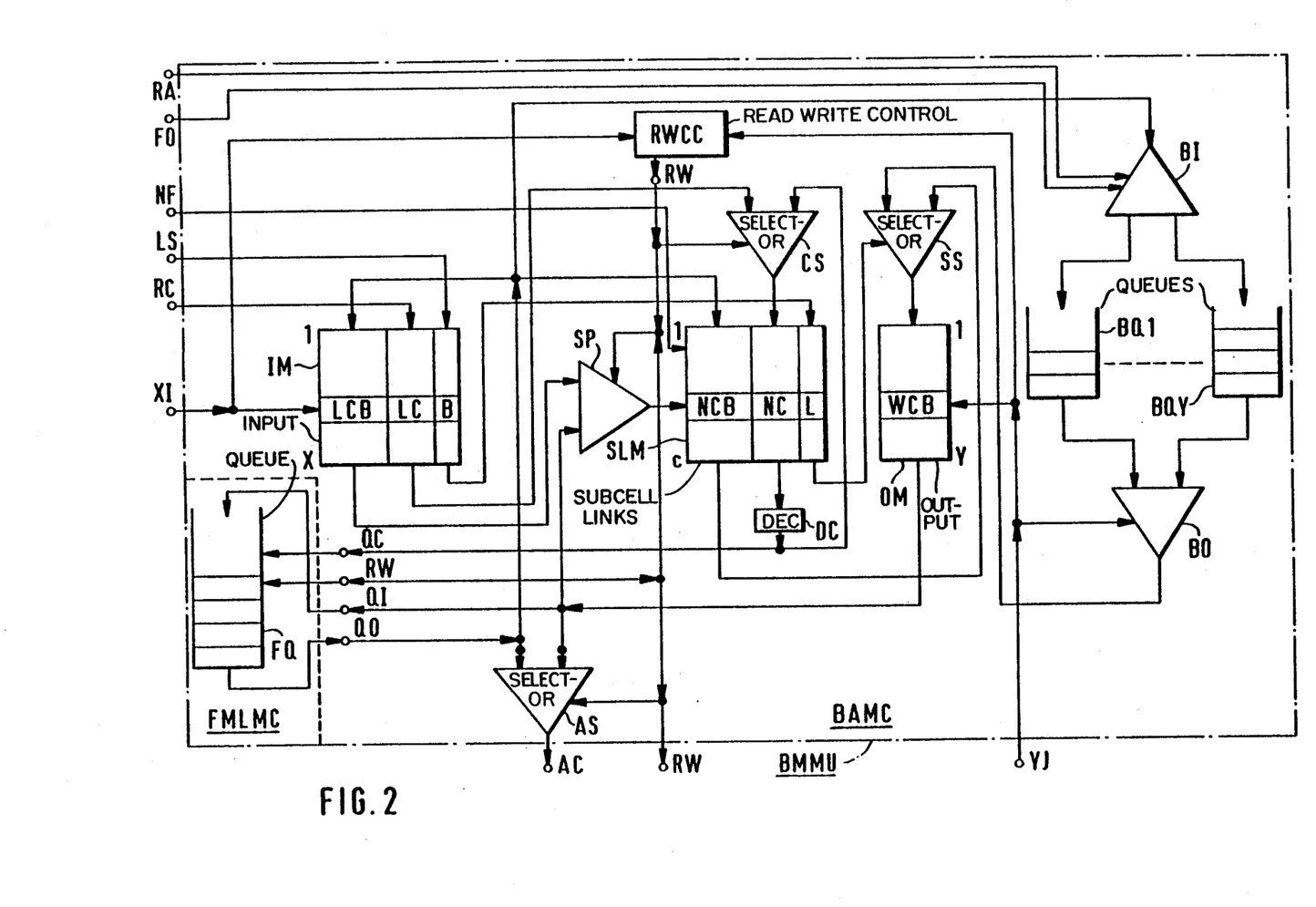
FIG. 2 shows the buffer memory management unit BMMU of FIG. 1 in more detail.

Reference is now made to FIG. 2 which shows the buffer memory management unit BMMU of FIG. 1 in more detail.

As already mentioned, this buffer memory management unit BMMU has the inputs LS, FO, NF, RA, RC, XI, YJ, the outputs AC and RW. It includes a free memory location management circuit FMLMC and a busy memory location management circuit BAMC.

The circuit FMLMC of the unit BMMU is constituted by a free-buffers queue memory FQ which is a First-In-First-Out (FIFO) queue memory storing the addresses of all the free buffers of the memory BM. FMLMC has an input terminal QI, an output terminal QO and control terminals QC and RW.

The circuit BAMC of the unit BMMU mainly includes:
- a read/write control circuit RWCC providing the read/write selection signal RW controlled by both the clock signals XI and YJ and defining during each subcell period X first intervals to write a subcell in the buffer memory BM and Y second intervals for reading a subcell from this memory BM. The signal RW is de-activated during each first interval which comprises a read phase and a write phase in succession, whilst RW is activated during each second interval which comprises two read phases and a write phase in succession;
- an input memory IM with X locations allocated to respective ones of the X inputs I1/1X and each comprising parts LCB, LC and B to store for a subcell, the buffer memory address K, the signal RC and the signal LS respectively;

an output memory OM with Y locations WCB assigned to respective ones of the Y outputs O1/OY and each adapted to store the buffer memory address K of a subcell to be transferred to the corresponding output O1/OY;

a cell management memory constituted by a plurality of FIFO or cell management queue memories BQ1/BQY allocated to respective ones of the outputs O1/OY and used to store the buffer memory addresses K of the first subcells FSC of the cells;

a subcell link memory SLM with C locations corresponding to the C buffers of the buffer memory BM and each comprising parts NCB, NC and L to store for each subcell the buffer memory address K of the next following subcell in the same cell, the signal RC and the signal LS respectively. As will be explained in more detail later, the addresses in NCB are stored under the form of a linked list;

an address selector AS;
a link selector SP;
a decrementor DC;
a count selector CS;
a last subcell selector SS;
a distributor BI; and
a multiplexer BO.

All these constituent circuits of the unit BMMU are intercoupled in the way shown in FIG. 2 and which will become clear from the following description of the operation of the unit BMMU.

For simplicity reasons it is assumed that the switching element has an equal number of inputs and outputs, so that $X=Y$, operating at a same bitrate. In this case the read/write control circuit RWCC has to define during one subcell period X first intervals for which the read-/write selection signal RW de-activated (buffer memory write-in interval) and which are each constituted by a read phase followed by a write phase as already mentioned, as well as Y ($=X$) second intervals for which the signal RW is activated (buffer memory read-out interval) and which are each constituted by two successive read phases followed by a write phase. Moreover, because $X=Y$, the control circuit RWCC defines one first interval and one second interval in alternance.

In the following—and also to simplify the description—the processing of a cell comprising three successive subcells FSC, ISC and LSC is considered, it being assumed that these subcells are successively applied to the switch element input I1 and that they all have to be transferred to both the switching element outputs O1 and OY. This means that for this cell, a point-to-multipoint transfer is required.

The processings of the first subcell FSC, the second or intermediate subcell ISC and the third or last subcell LSC are described in succession for a first interval (write-in) and for two-second intervals (read-out) one for each output O1/OY. More in detail, each of these subcells FSC, ISC and LSC is written in the buffer memory BM and/or read out therefrom during one subcell period and in the order of their arrival at the input I1.

1. First Interval (Write-In)

As already mentioned, the read/write selection signal RW is de-activated during this first interval indicating that a write-in operation is running on the buffer memory BM.

1.1. The First Subcell (FSC)

This subcell FSC is first transferred from the input I1 to the corresponding input of the multiplexer MX via the circuits SP1 and IL1. Afterwards the following operations are performed during the above mentioned read and write phases of the first interval defined by the clock signal XI selecting the input I1 during a subcell period.

1.1.a. Read Phase

Under the control of the clock signal XI the first subcell FSC is transferred from the multiplexer input of MX to the inputs CI of the buffer memory BM, of the subcell logic SL and the routing logic RL. As a consequence the latter logics provide at their outputs the following control signals:

FO=1 because a first subcell is concerned;
NF=0 because a first subcell is concerned;
LS=0 because the subcell is not a last one;
RA: indicating the addresses of two of the cell management queue memories, e.g. BQ1 and BQY, associated to the outputs O1 and OY to which the cell and thus also the first subcell FSC thereof have to be transferred; and
RC=2 because the cell has to be transferred to two outputs O1 and OY.

These control signals are all applied to the like named inputs of the buffer memory management unit BMMU together with the clock signals XI and YJ. The control signal FO enables the distributor BI whilst the control signal NF inhibits the part NCB of the memory SLM from operating. The control signals RC and LS are applied to the input memory IM and more particularly to the parts LC and B thereof respectively.

On the other hand XI and YJ have the effect that the de-activated selection signal RW produced by the circuit RWCC allows the free-buffers queue memory FQ to be read and enables the selectors AS, SP, and CS to apply data from FQ, IM (LCB), and IM (LC) to the address input AC of the buffer memory BM, to the address input of the memory SLM, and to the part NC of this memory SLM respectively.

When the free-buffers queue memory FQ is read out it supplies a free buffer memory address, say A1, to the address input AC via the write-enabled address selector AS, to the memories IM (LCB) and SLM (NCB), and to the enabled distributor BI.

Also the data previously stored in the input memory IM (LCB, LC, B) and belonging to the previous subcell received on the input I1 is read-out and respectively transmitted to the address input of the memory SLM via the selector SP, to the part NC of this memory SLM via the selector CS, and to the part L of SLM. However this operation is not considered here as it does not relate to the considered first subcell FSC.

1.1.b. Write Phase

During this phase:
the first subcell FSC is effectively written in the buffer of the buffer memory BM having the address A1 provided at the address input AC. This buffer should therefore be made busy;
the data A1, 2 (=RC) and 0 (=LS) relating to the first subcell FSC are respectively written in the parts LCB, LC and B of the location of the input memory IM pointed at by the clock signal XI and corresponding to the input I1; and the address A1 of the busy buffer is also transferred into both the cell management queue memories BQ1 and BQY via the enabled distributor BI.

From the above it follows that by using of a free buffer for storing a first subcell FSC this buffer is made busy by storing its address A1 in one or more of the cell management queue memories (BQ1/BQY).

1.2. The second or Intermediate Subcell (ISC)

This second subcell ISC is processed in the same way as the first subcell FSC considered above. The following operations are performed.

1.2.a. Read Phase

The control signals provided in this case differ from those for the first subcell FSC by the fact that FO=0 and NF=1 so that in the buffer memory management unit BMMU the operation of the distributor BI is inhibited, whilst that of the part NCB of the memory SLM is write-enabled As a consequence the free-buffers queue memory FQ provides another free buffer address, say A2, which is supplied to the address input AC via the write-enabled address selector AS, to the memories IM (LCB) and SLM (NCB), and to the inhibited distributor BI. Also the above data A1, 2, 0 stored in the respective parts LCB, LC and B of the input memory IM and belonging to the first subcell FSC are read-out and applied to the address input of the memory SLM via the enabled selector SP, to the part NC of this memory SLM via the enabled selector CS, and to the part L of SLM respectively.

1.2.b. Write Phase

During this phase the second subcell ISC is effectively written in the buffer of the memory BM having the address A2 provided at the address input AC. Furthermore:
- the data A2, 2 (=RC), 0 (=LS) is written in the parts LCB, LC and B of the location of the input memory IM pointed at by the clock signal XI and corresponding to the input I1; and
- the same data A2, 2, 0 is written in the parts NCB, NC and L of the location of the memory SLM having the address A1.

In this way the buffer memory address A2 of the second subcell ISC is linked to the buffer memory address A1 of the first subcell FSC in a linked list stored in the memory SLM and more particularly in the part NCB thereof.

1.3. The Third or Last Subcell (LSC)

This third subcell LSC is processed in a similar way as the second subcell ISC considered above, the following operations being thereby performed.

1.3.a. Read Phase

The control signals provided in this case differ from those for the second subcell by the fact that LS=1. The free-buffers queue memory FQ provides another free buffer address, say A3, which is supplied to the address input AC, to the memories IM (LCB) and SLM (NCB), and to the inhibited distributor BI. Also the above data A2, 2, 0 stored in the parts LCB, LC and B of the input memory IM and belonging to the second subcell ISC are read-out and applied to the address input of the memory SLM, to the part NC of this memory SLM, and to the part L of SLM respectively.

1.3.b. Write Phase

During this phase:
- the third subcell LSC is written in the buffer of the memory BM having the address A3;
- the data A3, 2, 1 are respectively written in the parts LCB, LC, B of the location of the input memory IM pointed at by the clock signal XI and corresponding to the input I1; and
- the data A3, 2, 0 are respectively written in the parts NCB, NC and L of the location of the memory SLM having the address A2.

It is to be noted that during the following subcell period and more particularly during the first interval for the input I1 thereof, the data stored in the locations LC and B of the input memory IM pointed at by the clock signal XI will be transferred to the subcell link memory SLM in the respective locations NC and L at the address A3 thereof.

From the above it follows that at the end of the third subcell period following the described operations:
- both the cell management queue memories BQ1 and BQY store the buffer memory address A1 of the first subcell FSC;
- the input memory IM stores information A3, 2, 1 of the last subcell LSC; and
- the subcell link memory SLM stores the following linked list:

| Address of SLM | Contents of SLM |
| --- | --- |
| A1 | A2, 2, 0 |
| A2 | A3, 2, 0 |
| A3 | *, 2, 1 | where * means non significant data.

2. Second Interval (read-out) for Output 01

As mentioned above, the read/write selection signal RW is activated during this second interval indicating that a read-out operation is running on the buffer memory BM.

In the following description we shall assume that the address A1 stored in the cell management queue memory BQ1 is selected before the same address A1 stored in the cell management queue memory BQY.

Under the control of the output clock signal YJ selecting on the multiplexer BO, the input corresponding to the cell management queue memory BQ1, and during the corresponding second interval the three subcells FSC, ISC and LSC stored in the buffer memory BM at the respective addresses A1, A2 and A3, are read out, each during one subcell period, in the order in which they were stored in this buffer memory BM due to the presence of the linked list in the subcell link memory SLM. These subcells are thereby each successively supplied to the output O1 via the enabled output of the demultiplexer DX and the converter circuit PS1.

2.1. The First Subcell (FSC)

For reading out the first subcell FSC whose address A1 was stored in the cell management queue memory BQ1, we should assume that this address A1 is already transferred to the output memory OM in the location WCB pointed at by the clock signal YJ and corresponding to the output O1. This transfer operation is not considered in detail now but will become clear from the description given later.

2.1.a. First Read Phase

The activated selection signal RW produced by the circuit RWCC allows the free buffers queue memory FQ to be written upon de-activation of the control signal QC, i.e. QC=0, at the like named control terminal, and enables the selectors AS, SP and CS to apply data from the output memory OM (WCB) and the decrementor DC to the address input AC of the buffer memory BM, to the address input of the memory SLM and to the part NC of this memory SLM.

The address A1 of the first subcell FSC is transferred from the location WCB of the output memory OM to the address input AC of the buffer memory BM via the read-enabled address selector AS, to the address input of the subcell link memory SLM via the enabled selector SP, and to the input terminal QI of the free memory location management circuit FMLMC.

2.1.b. Second Read Phase

During this phase:
- the first subcell FSC is effectively read from the buffer of the buffer memory BM having the address A1 and transferred to the output O1 via the demultiplexer DX and the parallel-to-series converter circuit PSI; and
- the data A2, 2, 0 stored in the parts NCB, NC and L of the location of the memory SLM pointed at by the address A1 are transmitted to the output memory OM via the enabled selector SS, to the decrementor DC, and to the control terminal of this selector SS respectively. The input of the selector SS at which the address A2 is applied is enabled by the signal coming from the part L of the memory SLM, the contents thereof being 0. Because the control signal QC, which is the value at the output of the decrementor DC, is not equal to 0 (but 1), this signal QC is activated and inhibits the storage of the address A1 in the free-buffers queue memory FQ. Moreover this value 1 is also applied to the part NC of the memory SLM via the enabled selector CS.

2.1.c. Write Phase

During this phase:
- the address A2 supplied to the output memory OM is stored in the location WCB thereof pointed at by the clock signal YJ and corresponding to the output O1; and
- the value 1 supplied to the part NC of the memory SLM is stored in the location thereof pointed at by the address A1. This location of the memory SLM now contains the information A2, 1, 0.

2.2. The Second or Intermediate Subcell (ISC)

The reading-out operation of the second subcell ISC only differs from that of the first subcell FSC by the fact that the address now stored in the location WCB of the output memory OM pointed at by the clock signal YJ and corresponding to the output O1 is A2 instead of A1.

2.2.a. First Read Phase

The address phase A2 of the second subcell ISC is transferred from the location WCB of the output memory OM to the address input AC of the buffer memory BM via the read-enabled address selector AS, to the address pointer of the subcell link memory SLM via the enable selector SP, and to the input terminal QI of the free memory location management circuit FMLMC.

2.2.b. Second Read Phase

During this phase:
- the second subcell ISC is read from the buffer of the buffer memory BM having the address A2 and transferred to the output O1 via the demultiplexer DX and the converter circuit PS1; and
- the data A3, 2, 0 stored in the parts NCB, NC and L of the location of the memory SLM pointed at by the address A2 are transmitted to the output memory OM via the enabled selector SS, to the decrementor DC, and to the control terminal of this selector SS respectively. The input of the selector SS at which the address A3 is applied is still enabled by the signal coming from the part L of the memory SLM and which is equal to 0. Again, because the value at the output of the decrementor DC and thus the signal QC is not yet equal to 0 (but 1), this signal QC inhibits the storage of the address A2 in the free memory location management circuit FMLMC. Moreover this value 1 is applied to the part NC of the memory SLM via the enabled selector CS.

2.2.c. Write Phase

During this phase:
- the address A3 is supplied to the output memory OM is stored in the location WCB thereof pointed at by the clock signal YJ; and
- the value 1 supplied to the part NC of the memory SLM is stored in the location thereof pointed at by the address A2. This location of the memory SLM pointed at by the address A2 now contains A3, 1, 0.

2.3. The Third or Last Subcell (LSC)

The reading-out operation of the third and last subcell LSC only differs from that of the first subcell FCS and of the second subcell ISC by the fact that the address now stored in the location WCB of the output memory OM pointed at the clock signal YJ and the corresponding to the output O1 is now A3 and that the signal stored in the part L of the memory SLM at the address A3 is 1.

2.3.a. First Read Phase

The address A3 of the last subcell LSC is transferred from the location WCB of the output memory OM to the address input AC of the buffer memory BM, to the address pointer of the subcell link memory SLM, and to the input terminal QI.

2.3.b. Second Read Phase

During this phase:
- the last subcell LSC is read from the buffer of the memory BM having the address A3 and transferred to the output O1; and
- the data *, 2, 1 stored in the parts NCB, NC and L of the location of the memory SLM pointed at by the address A3 are transmitted to the selector SS, to the decrementor DC, and to the control terminal of this selector SS respectively. However, because the signal (L) at the control terminal of SS is now 1, the other input of this selector SS is enabled instead of the one at which the data * is applied. At this other input of SS, the address of the next first subcell which was stored in the cell management queue memory BQ1 is supplied via the enabled multiplexer BO. As a result, this address of the next first subcell is applied to the output memory OM. Because the value at the output of the decrementor DC is not yet equal to 0 (but 1), this value 1 is applied to the control terminal QC of the circuit FMLMC whereby it still inhibits the storage of the address A3 therein. This value 1 is also applied to the part NC of the memory SLM.

2.3.c. Write Phase

During this phase:
the address of the next first subcell supplied to the output memory OM is stored in the location WCB thereof pointed at by the clock signal YJ; and
the value 1 supplied to the part NC of the memory SLM is stored in the location thereof pointed at by the address A3. This location of the memory SLM pointed at by the address A3 now contains *, 1, 1.

From the above it follows that during this second interval for the output O1 none of the busy addresses A1, A2 and A3 are made free because the control signal QC was permanently activated so that the operation of the circuit FMLMC was inhibited. The reason therefore is that the subcells FSC, ISC and LSC must remain stored in the buffer memory BM for being read for the other output OY. The latter operation is described below.

3. Second Interval (Read-Out) for Output OY

The exit of the three subcells FSC, ISC, LSC to the output OY is performed in a similar way as their exit to the output O1 described above but at another moment. This other moment may, for each of these subcells, either be during a different subcell period or during the same subcell period as for the output O1. The latter happens for instance when the address A1 is simultaneously the first output of both the cell management queue memories BQ1 and BQY.

3.1. The First Subcell (FSC)

As for the second interval for the output O1, here again we should assume that the address A1 of the first subcell FSC is already read from the cell management queue memory BQY and stored in the output memory OM in the location WCB pointed at by the clock signal YJ.

3.1.a. First Read Phase

During this first read phase of the first subcell FSC, the operations are exactly the same as the corresponding ones described above for the second interval for the output 01 at point 2.1.a.

3.1.b. Second Read Phase

During this phase:
the first subcell FSC is read from the buffer of the memory BM having the address A1 and transferred to the output OY via the enabled demultiplexer DX and the parallel-to-series converter circuit PSY; and
the data A2, 1, 0 stored in the parts NCB, NC and L of the location of the memory SLM pointed at by the address A1 are transmitted to the output memory OM via the enabled selector SS, to the decrementor DC, and to the control terminal of this selector SS respectively. The input of the selector SS at which the address A2 is applied is enabled by the signal coming from the part L of SLM and which is equal to 0. The value at the output of the decrementor DC is now equal to 0 which means that the control signal QC is de-activated whereby the storage of the address A1 in the free-buffers queue memory FQ of the circuit FMLMC is allowed. As a result, the buffer of the memory BM having the address A1 becomes free and may be used for storing another subcell therein. Indeed, the first subcell FSC previously stored in this buffer of address A1 needs no more to be latched by the switching element since it has now been transferred to the two destination outputs O1 and OY. Moreover this value 0 is applied to the part NC of the memory SLM via the enabled selector CS.

3.1.c. Write Phase

During this phase:
the address A2 supplied to the output memory OM is stored in the location WCB thereof pointed at by the clock signal YJ; and
the value 0 supplied to the part NC of the memory SLM is stored in the location thereof pointed at by the address A1. This location of the memory SLM pointed at by the address A1 now contains A2, 0, 0 but will no more be used for the cell currently handled and may be overwritten by other information.

3.2. The Second or Intermediate Subcell (ISC)

As for the second interval for the output O1, this reading-out operation of the second subcell ISC only differs from that of the first subcell FSC by the fact that the address now stored in the location WCB of the output memory OM pointed at by the clock signal YJ is A2 instead of A1.

3.2.a. First Read Phase

This first read phase of the second subcell ISC is exactly the same as the corresponding one described above for the second interval for the output O1 at the point 2.2.b.

3.2.b. Second Read Phase

During this phase:
the second subcell ISC is read from the buffer of the memory BM having the address A2 and transferred to the output OY; and
the data A3, 1, 0 stored in the parts NCB, NC and L of the location of the memory SLM pointed at by the address A2 are transmitted to the output memory OM via the selector SS, to the decrementor DC, and to the control terminal of this selector SS respectively. Now again the value at the output of the decrementor DC is equal to 0 so that the corresponding control signal QC allows the storage of the address A2 in the free-buffers queue memory FQ. In this way the buffer of the memory BM having the address A2 also becomes free. This value 0 is also applied to the part NC of the memory SLM via the enabled selector CS.

3.2.c. Write Phase

During this phase:
the address A3 supplied to the output memory OM is stored in the location WCB thereof pointed at by the clock signal YJ; and the value 0 supplied to the part NC of the memory SLM is stored in the location thereof pointed at by the address A2. This location of the memory SLM pointed at by the address A2 now contains A3, 0, 0 and will no more be used for the cell currently handled and may be overwritten.

3.3. The Third Or Last Subcell (LSC)

As for the second interval for the output 01, this reading-out operation of the third and last subcell LSC differs from that of the first subcell FSC and of the second subcell ISC by the fact that the address now stored in the location WCB of the output memory OM pointed at by the clock signal YJ is A3 and that the signal stored in the part L of the memory SLM is 1.

3.3.a. First Read Phase

This first read phase of the third subcell LSC is exactly the same as the corresponding one described above for the second interval for the output O1 at the point 2.3.a.

3.3.b. Second Read Phase

During this phase:
the last subcell LSC is read from the buffer of the memory BM having the address A3 and transferred to the output OY; and
the data *, 1, 1 stored in the parts NCB, NC and L of the location of the memory SLM pointed at by the address A3 are transmitted to the selector SS, to the decrementor DC, and to the control terminal of this selector SS respectively. However, because the signal (L) at the control terminal of SS is now 1, the other input of this selector SS is enabled instead of the one at which the address * is applied. At this other input of SS, the address of the next first subcell which was stored in the cell management queue memory BQY is supplied via the multiplexer BO. As a result, this address of the next first subcell is applied to the output memory OM. Furthermore, the value at the output of the decrementor DC is now equal to 0 and the control signal QC allows the storage of the address A3 in the free-buffers queue memory FQ. In this way the buffer of the memory BM having the address A3 also becomes free. This value 0 is also applied to the part NC of the memory SLM.

3.3.c. Write Phase

During this phase:
the address of the next first subcell supplied to the output memory OM is stored in the location WCB thereof pointed at by the clock signal YJ and corresponding to the output OY; and
the value 0 supplied to the part NC of the memory SLM is stored in the location thereof pointed at by the address A3. This location of the memory SLM pointed at by the address A3 now contains *, 0, 1 but will no more be used for the cell currently handled and may be overwritten.

From the above it follows that during this second interval for the output OY all the buffer addresses A1, A2 and A3 are made free by the control signal QC which was permanently de-activated and was thereby enabling the operation of the free memory location management circuit FMLMC. This means that the subcells FSC, ISC and LSC stored in the buffers of the memory BM may be overwritten as well as the linked list of their addresses stored in the part NCB of the subcell link memory SLM. Moreover, the address A1 stored in both the cell management queue memories BQ1 and BQY was already removed therefrom by the operation which transfers this address A1 to the output memory OM during the second interval for the outputs O1 and OY respectively.

Figure 3:
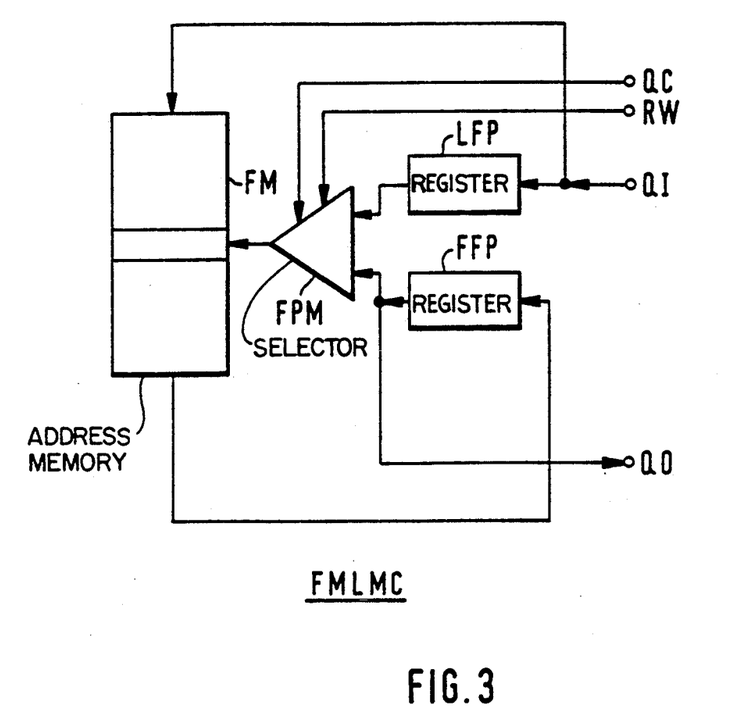
FIG. 3 represents a substitute circuit for the free memory location management circuit FMLMC of FIG. 2.

Another embodiment of the free memory location management circuit FMLMC is shown in FIG. 3 and includes an address memory FM able to store C addresses of buffers of the memory BM and wherein the addresses of the free buffers are stored under the form of a linked list.

This other embodiment of the circuit FMLMC further includes:
- a first-free-buffer pointer register FFP which stores the first free address of the linked list to be provided to the address input AC of the buffer memory BM;
- a last-free-buffer pointer register LFP which stores the last free address of the linked list received from the busy memory location management circuit, BAMC; and
- a selector FPM controlled by both the read/write selection signal RW and the control signal QC.

This other embodiment of the circuit FMLMC operates as follows.

During a first interval (write-in) of a subcell period, the address, say A1, of the first free buffer stored in the pointer register FFP is transmitted to the output terminal QO, whilst the address A2 stored in the address memory FM in the location pointed at by A1 is transmitted to this pointer register FFP wherein it replaces the address A1 and becomes the new first free address of the linked list. The address A1 previously stored in the pointer register FFP was applied to the address input of the address memory FM via the selector FPM enabled by the de-activated selection signal RW so as to allow a read-out operation from FM.

On the other hand, during a second interval (read-out) of a subcell period and when the control signal QC is de-activated, i.e. QC=0, while the read/write selection signal RW is activated, the address, say A2, supplied at the terminal QI from the circuit BAMC is stored in the address memory FM in the location pointed at by the address, say A1, stored in the pointer register LFP. This address A2 is then also stored in the pointer register LFP wherein it replaces the address A1 and becomes the new last free address of the linked list. During this operation, the selector FPM is controlled by both the signals QC and RW enabling a write operation in the address memory FM.

The above free memory location management circuit FMLMC may for instance also be constituted by a known Find-First-One (FFO) circuit such as the one described in "THE BELL SYSTEM—TECHNICAL JOURNAL" Vol. XLIII, No. 5, Part 1 of September 1964, pages 1869 to 1870. In that case, it is possible to use a Find-First-One circuit including a register of C bits. Each of these bits corresponds to a memory location in the buffer memory BM and is set to the binary value 1 when the latter location is free. A scanning operation on this register then allows the first bit set to 1 to be found and, after decoding, the corresponding memory location or address to be provided.

Although only mentioned for the free memory location management circuit FMLMC, the idea of replacing, in the busy memory location management circuit BAMC, the First-In-First-Out (FIFO) queue memories BQ1-BQY by linked lists of addresses or by Find-First-One circuits may also be considered. When linked lists of addresses are used, they could for instance be stored in Y busy addresses memories each able to store C addresses or memory locations.

Instead of checking the control header SCH explicitly contained in each incoming subcell, the subcell logic SL may for instance also detect the presence of non-idle and idle subcells, the words non-idle and idle being used here to respectively define subcells forming part of a cell, i.e. FSC, ISC and LSC, and other subcells such as for instance empty subcells or synchronization subcells. These idle subcells are identified by an explicit control header SCH or by another identification code. The signals LS, FO and NF are then correctly set either upon detection of an idle subcell followed by a non-idle subcell, i.e. a first subcell FSC, or upon detection of a non-idle subcell, i.e. a last subcell LSC, followed by an idle subcell. It is also possible to detect a last subcell LSC as a non-idle subcell followed by an explicitly identified first subcell FSC, as well as to detect a first subcell FSC as a non-idle subcell preceded by an explicitly identified last subcell LSC. In this way, either the first subcell FSC, the intermediate subcells ISC and/or the last subcell LSC of a cell no longer need to be explicitly identified by the control header SCH.

Contrary to the above described specific routing, it is also possible to route the cells to a group of outputs O1/OY. In that case, the address A1 of a first subcell FSC is no longer stored in one or more well defined cell management queue memories BQ1/BQY, whose identity is derived by the routing logic RL from the information contained in the cell control header CCH of this first subcell, but in one of these queue memories which is randomly chosen within a group of, e.g. 4, cell management queue memories.

For instance in case of a point-to-point transfer, if the switching element has Y=16 outputs O1-OY, the corresponding cell management queue memories may be divided into 4 groups of 4 queue memories each and the signal RA provided by the routing logic RL may select one of these 4 groups instead of one of the 16 queue memories. In practice, if the addresses 1 to 16 and thus also the signal RA are binary coded, e.g. by 4 bits, such an output group selection can easily be realized by using only the 2 most significant bits of the address, the 2 least significant bits allowing to perform a random choice between the 4 cell management queue memories of the selected output group.

It is to be noted that the destination output(s) or output groups O1/OY indicated to the distributor BI by the signal RA provided by the routing logic RL may for instance either be directly derived from the information contained in the cell control header CCH of a first subcell FSC or elaborated therefrom by means of calculation using a particular algorithm or label translation in a routing memory.

Finally, it should be noted that in the above use is made of the words cell and subcell although this is specifically Asynchronous Transfer Mode (ATM) terminology. However, one could also have used the words packet and packet segments.

While the principles of the invention have been described above in connection with specific apparatus, it is to be clearly understood that this description is made only by way of example and not as a limitation on the scope of the invention.

I claim:
1. Communication switching element having X inputs and Y outputs, wherein X and Y are not both equal to one, for transferring cells from each of said inputs to at least one of said outputs, said cells being subdivided into subcells, said switching element comprising
   a buffer memory with a plurality of memory locations each having an identity,
   means for writing into said memory locations distinct subcells incoming on said inputs,
   a first storage means storing memory location identities of subcells, and
   means for reading said subcells out of said buffer memory under the control of said first storage means and for supplying these read subcells to said outputs,
wherein said stored memory location identities are linked in identity groups, each of said identity groups corresponding to one of said cells.

2. Communication switching element according to claim 1, wherein said buffer memory is fully shared between said X inputs and said Y outputs.

3. Communication switching element according to claim 1, further comprising
   a second storage means for storing the identities of the free memory locations available for writing said subcells therein and for providing these identities to said writing means upon a subcell having to be written in said buffer memory.

4. Communication switching element according to claim 3, wherein said free memory location identity provided by said second storage means is also supplied to the first storage means.

5. Communication switching element according to claim 3, wherein said second storage means comprises a First-In-First-Out queue memory.

6. Communication switching element according to claim 3, wherein said second storage means comprises a third memory in which the identities of said free memory locations are stored in the form of a second linked list.

7. Communication switching element according to claim 6, wherein said second linked list has an associated write pointer indicative of the first free memory location of said second linked list to be provided to said writing means, and a read pointer indicative of the last free memory location received in said third memory, said write and read pointers each comprising a distinct register able to store one identity of a memory location of said buffer memory.

8. Communication switching element according to claim 3, wherein said second storage means comprises a Find-First-One circuit.

9. Communication switching element according to claim 1, wherein it is integrated in a single electronic chip.

10. Communication switching element according to claim 1, wherein each of said cells is subdivided into a variable plurality of subcells.

11. Communication switching element according to claim 1, wherein in said subcells are of equal length.

12. Communication switching element according to claim 1, wherein each of said identity groups, said stored memory location identities are linked in an order equal to their order in the cell.

13. Communication switching element according to claim 12, wherein all the subcells of a cell are supplied to said outputs in the same chronological order as they are applied to said inputs.

14. Communication switching element according to claim 12, wherein the last of said linked identities has an associated end-of-list indication.

15. Communication switching element according to claim 1, wherein the memory location identities of all said subcells are stored in said first storage means.

16. Communication switching element according to claim 15, wherein the memory location identities of the subcells of a cell are stored in said first storage means such that each memory location identity refers to the memory location identity of the next subcell of a same cell.

17. Communication switching element according to claim 16, wherein said first storage means comprises
a first memory wherein the memory location identity of the first subcell of each cell is stored and
a second memory having a number of memory locations equal to that of said buffer memory and storing for each cell a linked list of the memory locations identities of the subcells, other than the first one, of said cell, said first subcell memory location identity referring to the first identity of said linked list.

18. Communication switching element according to claim 17, wherein said first memory includes a plurality of submemories each associated with one of said outputs and wherein said memory locations identities of the first subcells are stored, said submemories providing said identities to said reading means upon a first subcell having to be read from said buffer memory.

19. Communication switching element according to claim 18, wherein each of said submemories comprises a First-In-First-Out queue memory.

20. Communication switching element according to claim 18, wherein
each of said cells contains a data block and is associated with routing data indicating to which of said outputs said cell has to be transferred, and
the memory location identity of the first subcell of a cell to be transferred to one of said outputs is stored, under the control of said routing data, into the one of said submemories associated with said one output.

21. Communication switching element according to claim 18, wherein
each of said cells contains a data block and is associated with routing data indicating to which of said outputs said cell has to be transferred, and
the memory location identity of the first subcell of a cell to be transferred to a plurality of outputs is stored, under the control of said routing data, into a corresponding plurality of submemories each associated with one output of said plurality of outputs.

22. Communication switching element according to claim 21, wherein the number of outputs of said plurality of outputs to which a cell has to be transferred is provided by said routing data and is associated to each memory location identity of said linked list in said second memory.

23. Communication switching element according to claim 22, wherein
the last of said linked identities has an associated end-of-list indication,
said inputs are coupled via a multiplexer circuit to a single input of said buffer memory having an output which is coupled to said outputs through a demultiplexer circuit,
said demultiplexer circuit which is controlled by a second clock circuit is coupled to said outputs via respective output reception means so as to supply during a subcell time interval one subcell from said buffer memory to each of said output reception means,
in each of said identity groups, said stored memory location identities are linked in an order equal to their order in the cell,
the last of said linked identities has an associated end-of-list indication,
for a same cell to be read-out from said buffer memory, said first memory provides during a first of said subcell time intervals the memory location identity of the first subcell of said cell to said reading means, and said second memory provides during each immediately following of said subcell time intervals one memory location identity of the other subcells of said cell in the order indicated by said linked list until said end-of-list indication is detected, and
when a memory location identity of a subcell is provided to said reading means by said second memory, said associated number of outputs is decreased by one.

24. Communication switching element according to claim 23, further comprising
a second storage means for storing the identities of the free memory locations available for writing said subcells therein and for providing these identities to said writing means upon a subcell having to be written in said buffer memory,
wherein, if, after being decreased by one, said number of outputs is equal to zero, the associated memory location identity is provided to said second storage means as a free memory location identity.

25. Communication switching element according to claim 17, wherein said first memory includes a plurality of submemories grouped in submemory groups, each of said submemory groups being associated with a corresponding group of said outputs.

26. Communication switching element according to claim 25, wherein each of said cells contains a data block and is associated with routing data indicating to which of said outputs said cell has to be transferred, and
under the control of said routing data, said memory location identity of the first subcell of a cell is stored in a randomly selected one of said submemories forming part of said submemory group associated with said group of outputs to which said first subcell has to be transferred.

27. Communication switching element according to claim 17, wherein each subcell contains a subcell header in order to distinguish said first subcell of a cell from other subcells.

28. Communication switching element according to claim 27, wherein
the last of said linked identities has an associated end-of-list indication, and
said subcell header of the last subcell of a cell is different from the subcell headers of other subcells.

29. Communication switching element according to claim 17, wherein it includes a subcell logic able to detect a succession of a subcell pertaining to a cell and a subcell not pertaining to any cell in order to recognize said subcell pertaining to a cell as the last subcell of said cell.

30. Communication switching element according to claim 17, wherein it includes a subcell logic able to detect a succession of a subcell pertaining to a first cell and of a first subcell pertaining to a second cell without any other intervening subcells to identify said subcell pertaining to said first cell as the last subcell of said first cell.

31. Communication switching element according to claim 17, further comprising
   a second storage means for storing the identities of the free memory locations available for writing said subcells therein and for providing these identities to said writing means upon a subcell having to be written in said buffer memory,
wherein said first memory also provides said memory location identities of said first subcells to said second storage means as free memory location identities upon the corresponding first subcells are read from said buffer memory.

32. Communication switching element according to claim 1, wherein said inputs are coupled via a multiplexer circuit to a single input of said buffer memory having an output which is coupled to said outputs through a demultiplexer circuit.

33. Communication switching element according to claim 32, wherein said inputs are coupled via respective input reception means to said multiplexer circuit which is controlled by a first clock circuit so as to supply to said buffer memory during a subcell time interval one subcell from each of said input reception means.

34. Communication switching element according to claim 32, wherein said demultiplexer circuit which is controlled by a second clock circuit is coupled to said outputs via respective output reception means so as to supply during a subcell time interval one subcell from said buffer memory to each of said output reception means.

35. Communication switching element according to claim 34, wherein
   said inputs are coupled via respective input reception means to said multiplexer circuit which is controlled by a first clock circuit so as to supply to said buffer memory during a subcell time interval one subcell from each of said input reception means, and
X write- in operations and Y read- out operations are performed on said buffer memory during a single one of said subcell time intervals.

36. Communication switching element according to claim 34, wherein
   in each of said identity groups, said stored memory location identities are linked in an order equal to their order in the cell,
   the last of said linked identities has an associated end-of-list indication, and
   for a same cell to be read- out from said buffer memory, said first memory provides during a first of said subcell time intervals the memory location identity of the first subcell of said cell to said reading means, and said second memory provides during each immediately following of said subcell time intervals one memory location identity of the other subcells of said cell in the order indicated by said linked list until said end-of-list indication is detected.

37. Communication switching element according to claim 1, wherein each of said cells contains a data block and is associated with routing data indicating to which of said outputs said cell has to be transferred.

38. Communication switching element according to claim 37, wherein under the control of said routing data, all the cells which have to be transferred to a same output are supplied to this output in the same order as they are incoming in said switching element.

39. Communication switching element according to claim 37, wherein each of said cells further contains a control header of which part contains said routing data.

40. Communication switching element according to claim 39, wherein said control header forms part of the first subcell of each cell.

41. Communication switching element according to claim 1, further comprising a subcell logic for detecting a succession in either order of a subcell pertaining to a cell and of a subcell not pertaining to any cell so as to recognize said subcell pertaining to a cell as the last-/first subcell of said cell.

42. Communication switching element according to claim 1, further comprising a subcell logic for detecting a succession in either order of a subcell pertaining to a first cell and of a subcell pertaining to a second cell without any other intervening subcells so as to recognize said subcell pertaining to said first cell as the last-/first subcell of said first cell.

43. Communication switching element having X inputs and Y outputs and wherein X and Y are not both equal to one, for transferring cells from each of said inputs to at least one of said outputs, said cells being subdivided into subcells and said switching element comprising a buffer memory with a plurality of memory locations each having an identity, means for writing into said memory locations distinct subcells incoming on said inputs, means for reading said subcells out of said buffer memory and for supplying these read subcells to said outputs, and a buffer memory management means for controlling said writing means and said reading means,
   wherein said buffer memory is fully shared between said X inputs and said Y outputs, and under the control of said buffer memory management means, said writing means write said subcells in any free ones of said memory locations of said buffer memory and said reading means rebuild each cell in function of the identities of said memory locations into which the subcells pertaining to said cell are written.

44. Communication switching element according to claim 43, wherein X and Y are not both equal to one, for transferring cells from each of said inputs to at least one of said outputs, said cells being subdivided into subcells and said switching element including
   a buffer memory with a plurality of memory locations each having an identity,
   means for writing into said memory locations distinct subcells incoming on said inputs,
   a storage means storing memory location identities of subcells, and
   means for reading said subcells out of said buffer memory under the control of said storage means and for supplying these read subcells to said outputs,
   wherein said stored memory location identities are linked in identity groups, each of said identity groups corresponding to one of said cells, and said buffer memory management means includes said storage means.

45. Method for transmitting variable length communication messages using cells divided into subcells, each of said subcells containing a subcell header, comprising the steps:
using the subcell headers to distinguish subcells pertaining to a cell from subcells not pertaining to any cell,
recognizing a subcell pertaining to a cell that follows a subcell not pertaining to any cell as a first subcell of a variable length message, and p1 recognizing a subcell pertaining to a cell that is followed by a subcell not pertaining to any cell as a last subcell of a variable length message.

46. Method for transmitting variable length communication messages using cells divided into subcells, each of said subcells containing a subcell header, comprising the steps:
using the subcell headers to distinguish subcells pertaining to one of said cells from subcells pertaining to another of said cells,
recognizing a subcell distinguished by its subcell header as pertaining to said one cell that follows a subcell distinguished by its subcell header as pertaining to said another cell without any other intervening subcells as the first subcell of said one cell, and
recognizing a subcell distinguished by its subcell header as pertaining to said one cell that is followed by a subcell distinguished by its subcell header as pertaining to said another cell without any other intervening subcells as the last subcell of said another cell.

* * * * *